(12) United States Patent
Lin

(10) Patent No.: US 11,871,870 B2
(45) Date of Patent: Jan. 16, 2024

(54) SPIRAL WATER FILLING DEVICE

(71) Applicant: FLAVOR DRIPS TECHNOLOGY CO., LTD., Taipei (TW)

(72) Inventor: Chih-Te Lin, Taoyuan (TW)

(73) Assignee: FLAVOR DRIPS TECHNOLOGY CO., LTD., Taipei (TW)

( * ) Notice: Subject to any disclaimer, the term of this patent is extended or adjusted under 35 U.S.C. 154(b) by 454 days.

(21) Appl. No.: 17/192,317

(22) Filed: Mar. 4, 2021

(65) Prior Publication Data
US 2022/0211207 A1 Jul. 7, 2022

(30) Foreign Application Priority Data

Jan. 6, 2021 (TW) .................................. 110100384

(51) Int. Cl.
*A47J 31/46* (2006.01)
*A47J 31/44* (2006.01)

(52) U.S. Cl.
CPC ......... *A47J 31/468* (2018.08); *A47J 31/4403* (2013.01)

(58) Field of Classification Search
CPC .................................................... A47J 31/468
See application file for complete search history.

(56) References Cited

U.S. PATENT DOCUMENTS

2018/0310749 A1* 11/2018 Hugi ........................ A47J 31/22

FOREIGN PATENT DOCUMENTS

| CN | 201888696 U | 7/2011 | |
| CN | 205031059 U | 2/2016 | |
| CN | 106175440 A | 12/2016 | |
| CN | 106913216 A | 7/2017 | |
| CN | 107997591 A | 5/2018 | |
| JP | 3173367 U | 2/2012 | |
| JP | 2017094107 A * | 6/2017 | ............... A23F 5/06 |
| JP | 2017094107 A | 6/2017 | |
| TW | M425614 U | 4/2012 | |

OTHER PUBLICATIONS

JP_2017094107_translated via ESPACENET.com (Year: 2023).*
Office Action dated May 21, 2021 of the corresponding Taiwan patent application No. 110100384.
Office Action dated Nov. 22, 2022 of the corresponding Japan patent application No. 2021-207172.

* cited by examiner

*Primary Examiner* — Nathaniel E Wiehe
*Assistant Examiner* — Keith Brian Assante
(74) *Attorney, Agent, or Firm* — Chun-Ming Shih; HDLS IPR SERVICES

(57) ABSTRACT

A spiral water filling device including a fixing base, a rotating shaft tube, a motor, a carrier frame, a reciprocating screw, a transmission gear set, a nut slider, and a water filling pipe. The rotating shaft tube is pivotally disposed on the fixing base. The motor engages with the rotating shaft tube. The carrier frame is connected with the rotating shaft tube and has a first guiding structure. The reciprocating screw is perpendicular to the rotating shaft tube and parallel to the first guiding structure. The reciprocating screw and the rotating shaft tube are non-intersected. The transmission gear set is connected between the rotating shaft tube and the reciprocating screw. The nut slider engages with the reciprocating screw. The nut slider has a water outlet and a second guiding structure. The water filling pipe passes through the rotating shaft tube and connects with the water outlet.

9 Claims, 8 Drawing Sheets

SPIRAL WATER FILLING DEVICE

TECHNICAL FIELD

The disclosure relates to a spiral water filling device, particularly to a spiral water filling device with water entering via a rotating shaft.

RELATED ART

Spiral water filling devices are primarily applied to coffee brewing machines. The spiral water filling actions which simulate hand brewed coffee can maintain uniform quality in comparison with manual brewing. Related-art spiral water filling devices usually use a motor to drive an upright rotating shaft to rotate by itself. A lower end of the rotating shaft is provided with a carrier mounted by a water filling head. While the carrier is rotating, the motor further horizontally moves the water filling head on the carrier. As a result, the water filling head can be driven to horizontally move on a level along a spiral path. However, the water filling head is driven by a screw rod to be horizontally movable on the carrier, and a central axial line of the screw rod perpendicularly intersects a central axial line of the rotating shaft. Thus, interference may occur if a water filling soft pipe is connected over the water filling head. A related-art water filling soft pipe arrangement is to connect the pipe to a lateral side of the water filling head under the carrier. When operating, interference may still occur. Also, the water filling head is not straight tube and needs to be further provided with a fastener structure. Thus, fabrication of the water filling head is not easy.

In view of this, the inventors have devoted themselves to the above-mentioned related-art, researched intensively and cooperated with the application of science to try to solve the above-mentioned problems. Finally, the disclosure which is reasonable and effective to overcome the above drawbacks is provided.

SUMMARY OF THE DISCLOSURE

The disclosure provides a spiral water filling device with water entering via a rotating shaft.

The disclosure provides a spiral water filling device which includes a fixing base, a rotating shaft tube, a motor, a carrier frame, a reciprocating screw, a transmission gear set, a nut slider, and a water filling soft pipe. The rotating shaft tube is pivotally disposed on the fixing base. The motor is fixed on the fixing base and engages with an outer wall of the rotating shaft tube to drive the rotating shaft tube. The carrier frame is connected with the rotating shaft tube to rotate in conjunction with the rotating shaft tube and is provided with a first guiding structure. The reciprocating screw is pivotally disposed on the carrier frame and is perpendicular to the rotating shaft tube and parallel to the first guiding structure. A central axial line of the reciprocating screw and a central axial line of the rotating shaft tube are non-intersected. The transmission gear set is connected between the rotating shaft tube and the reciprocating screw to make the rotating shaft tube drive the reciprocating screw. The nut slider is connected and engages with the reciprocating screw. The nut slider has a water outlet and a second guiding structure attached on the first guiding structure. The water outlet is parallel to the rotating shaft tube. The water filling soft pipe passes through the rotating shaft tube and connected with the water outlet.

In the spiral water filling device of the disclosure, the transmission gear set includes an annular bevel gear, a regular gear and a reduction gear, the annular bevel gear surrounds the rotating shaft tube, the regular gear is coaxially connected with the reciprocating screw, the reduction gear includes a bevel gear end and a regular gear end coaxially arranged, the bevel gear end engages with the annular bevel gear, and the regular gear end engages with the regular gear. A first thread groove and a second thread groove are disposed on an outer side wall of the reciprocating screw opposite in spiral direction and intersected with each other.

In the spiral water filling device of the disclosure, the nut slider is provided with a key bar which engages with the reciprocating screw. The key bar is pivotally disposed in the nut slider to deflect.

In the spiral water filling device of the disclosure, the carrier frame has a guiding trough, and the water outlet perpendicularly penetrates the guiding trough and is slidable along the guiding trough.

In the spiral water filling device of the disclosure, the guiding trough is perpendicular to the rotating shaft tube and parallel to the reciprocating screw. A central axial line of the guiding trough intersects the central axial line of the rotating shaft tube.

In the spiral water filling device of the disclosure, the first guiding structure and the second guiding structure are a plane respectively, or the first guiding structure is a rod and the second guiding structure is a channel.

When using the spiral water filling device of the disclosure, the reciprocating screw is arranged on a side near the rotating shaft tube to make the water filling soft pipe pass through the rotating shaft tube and extend into the carrier frame to connect with the water outlet. As a result, the water filling soft pipe of the spiral water filling device of the disclosure may be hidden inside. Apart from aesthetic appearances, no interference occurs when the water outlet is moving.

DETAILED DESCRIPTION OF THE DISCLOSURE

Figure 1:
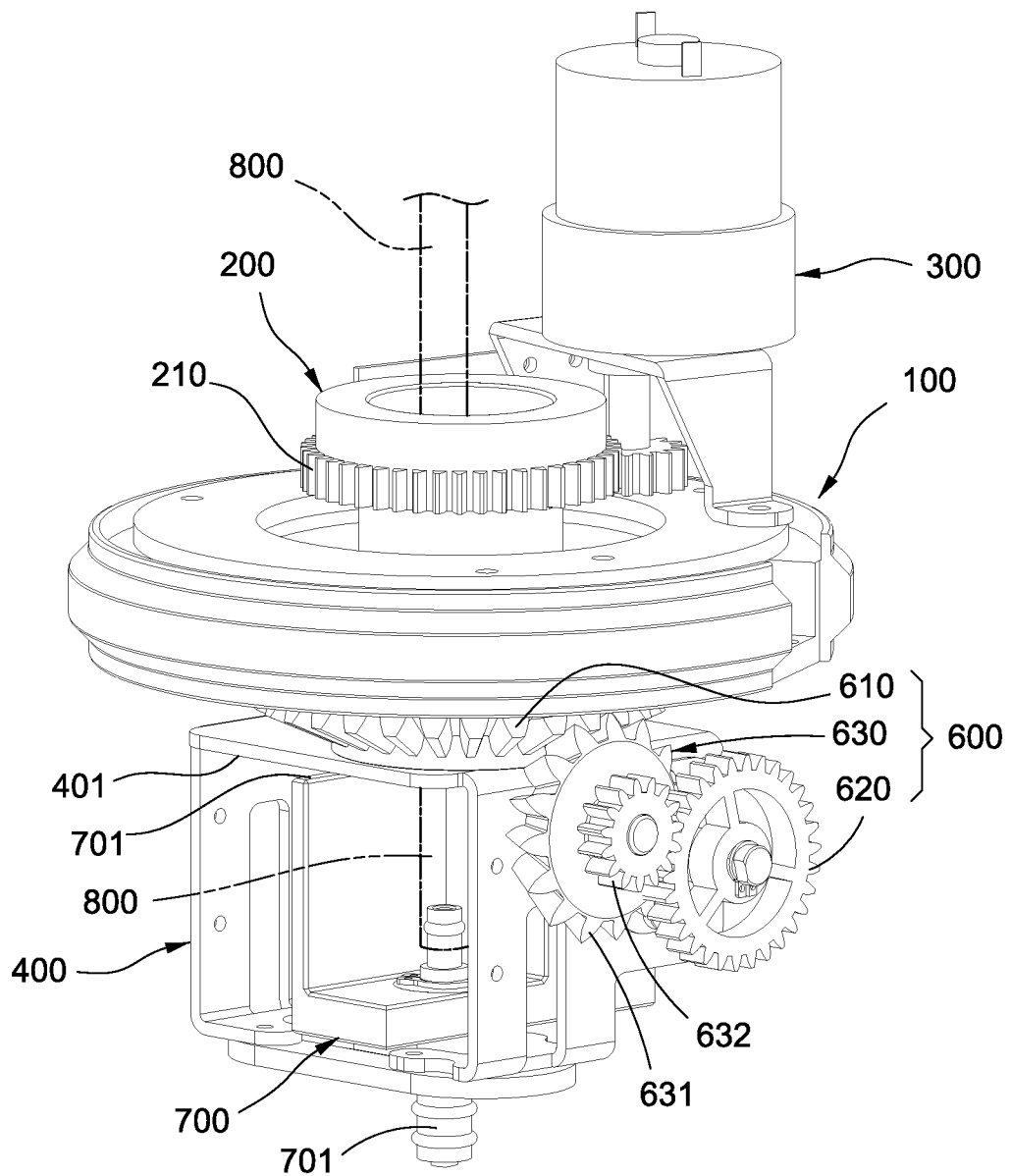
FIGS. 1 and 2 are perspective schematic views of the spiral water filling device of the first embodiment of the disclosure.
Figure 2:
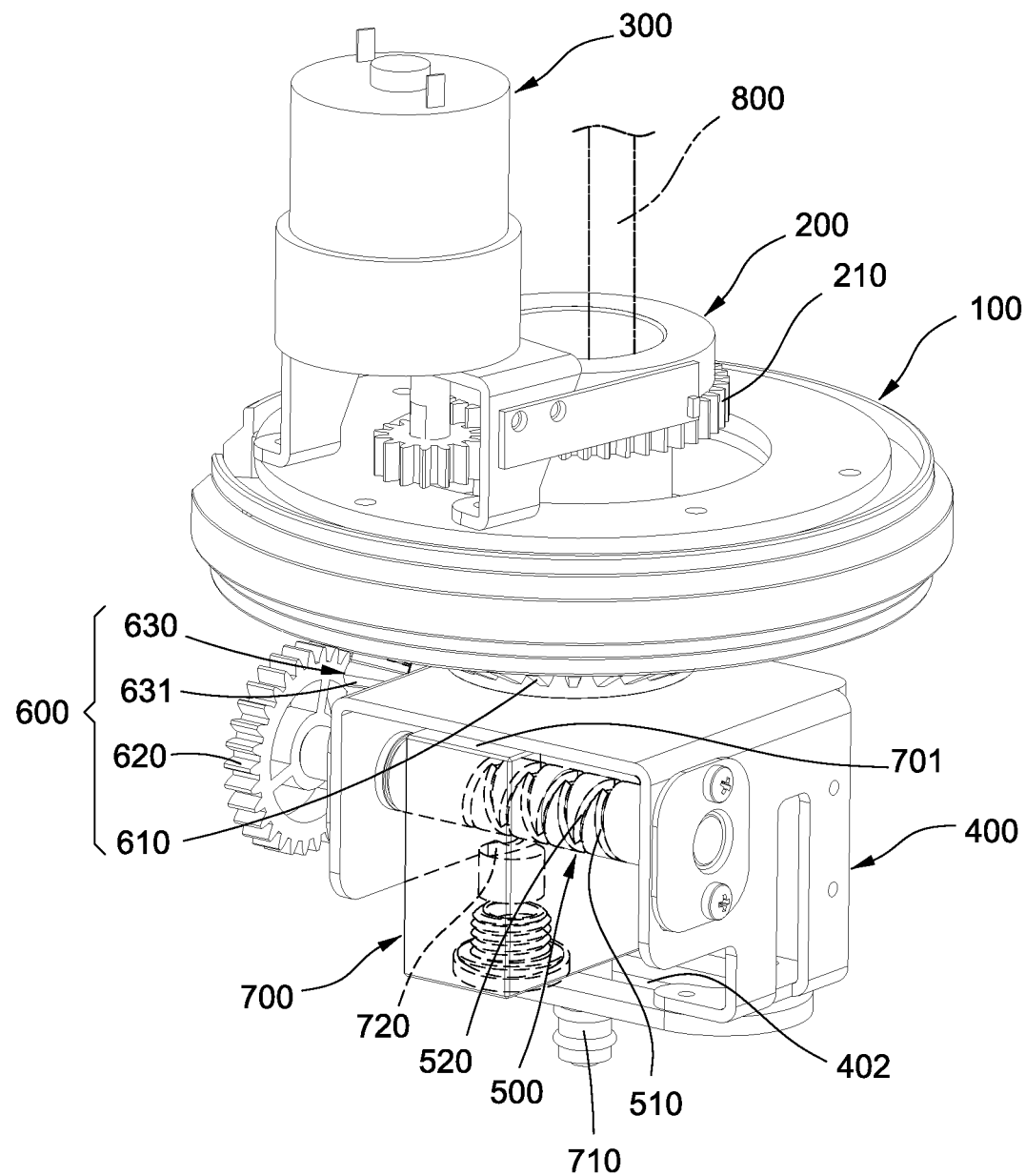
Figure 3:
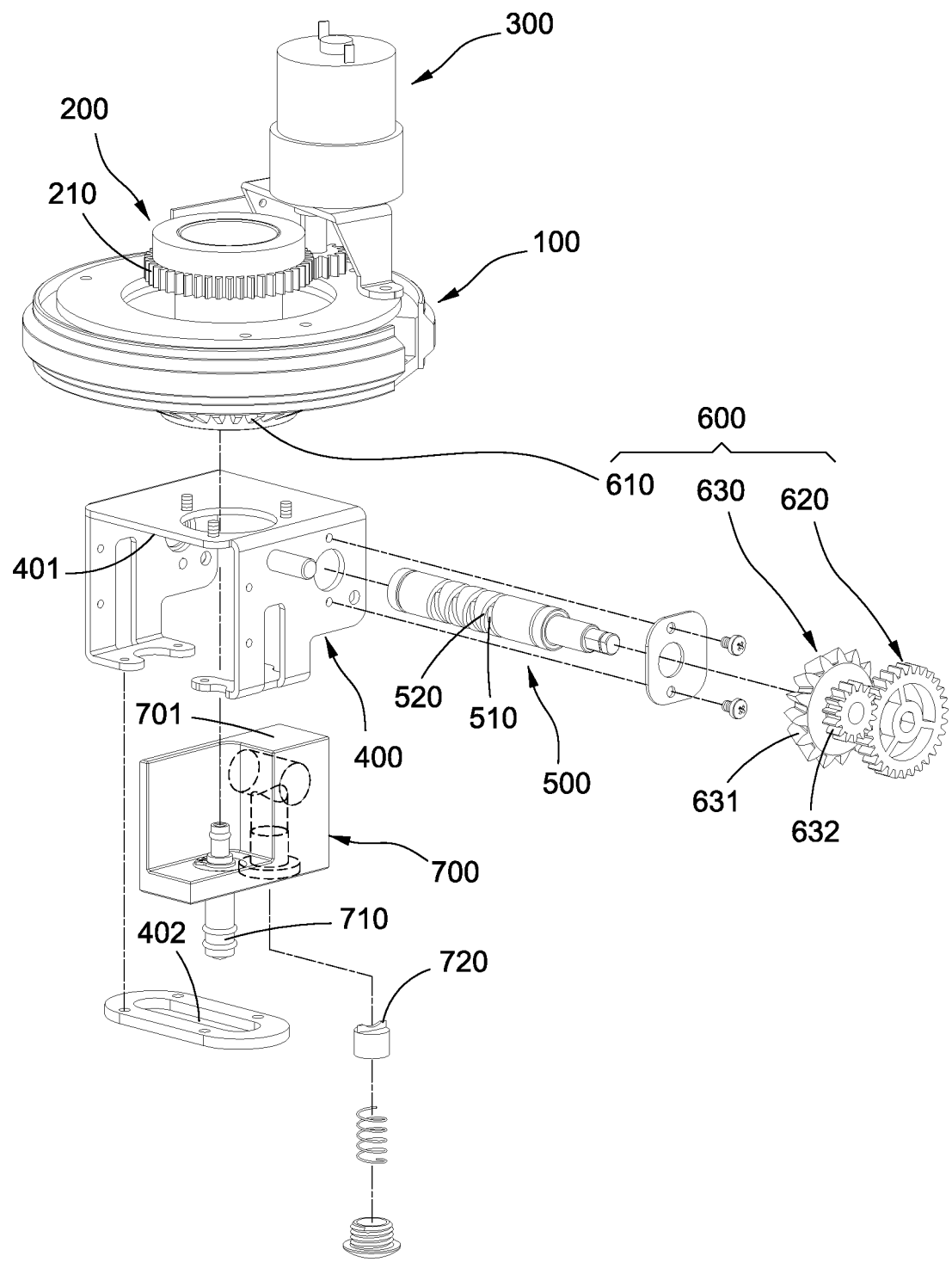
FIGS. 3 and 4 are exploded schematic views of the spiral water filling device of the first embodiment of the disclosure.
Figure 4:
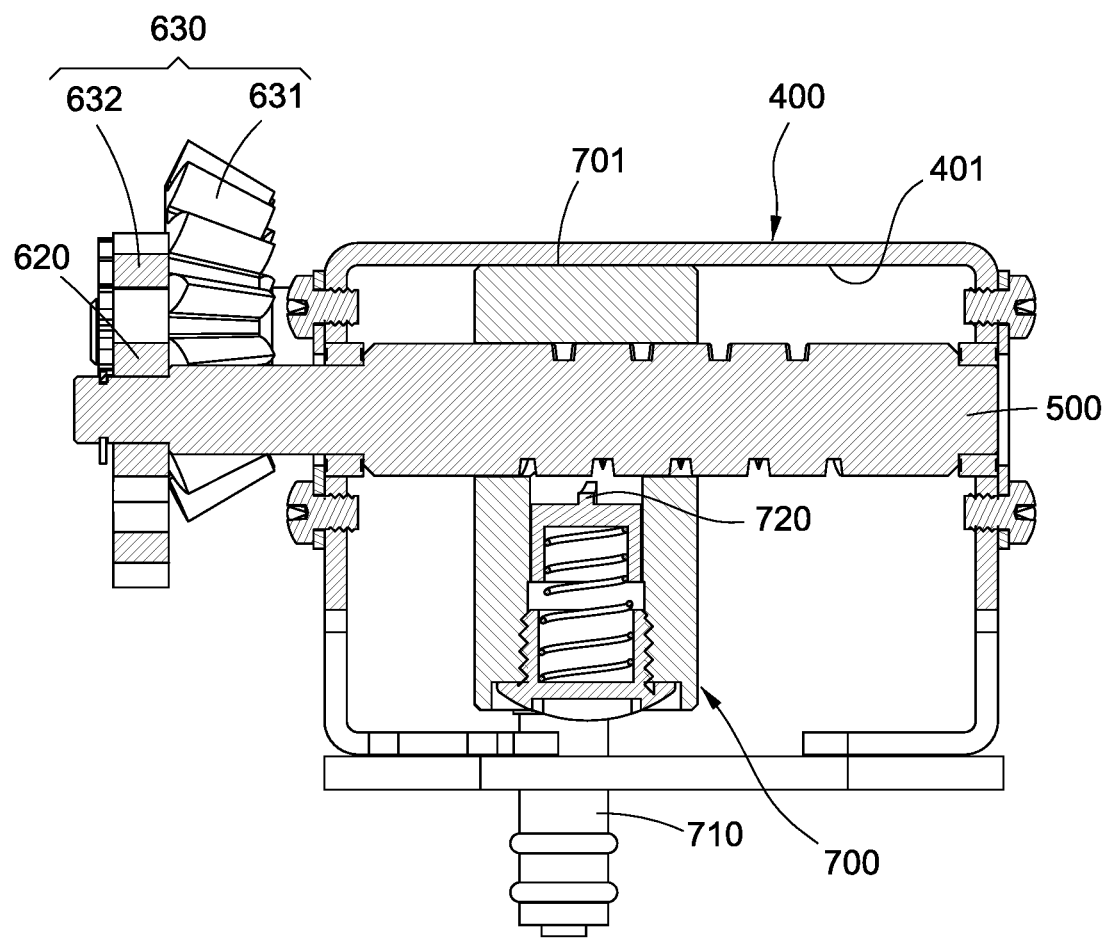
Figure 5:
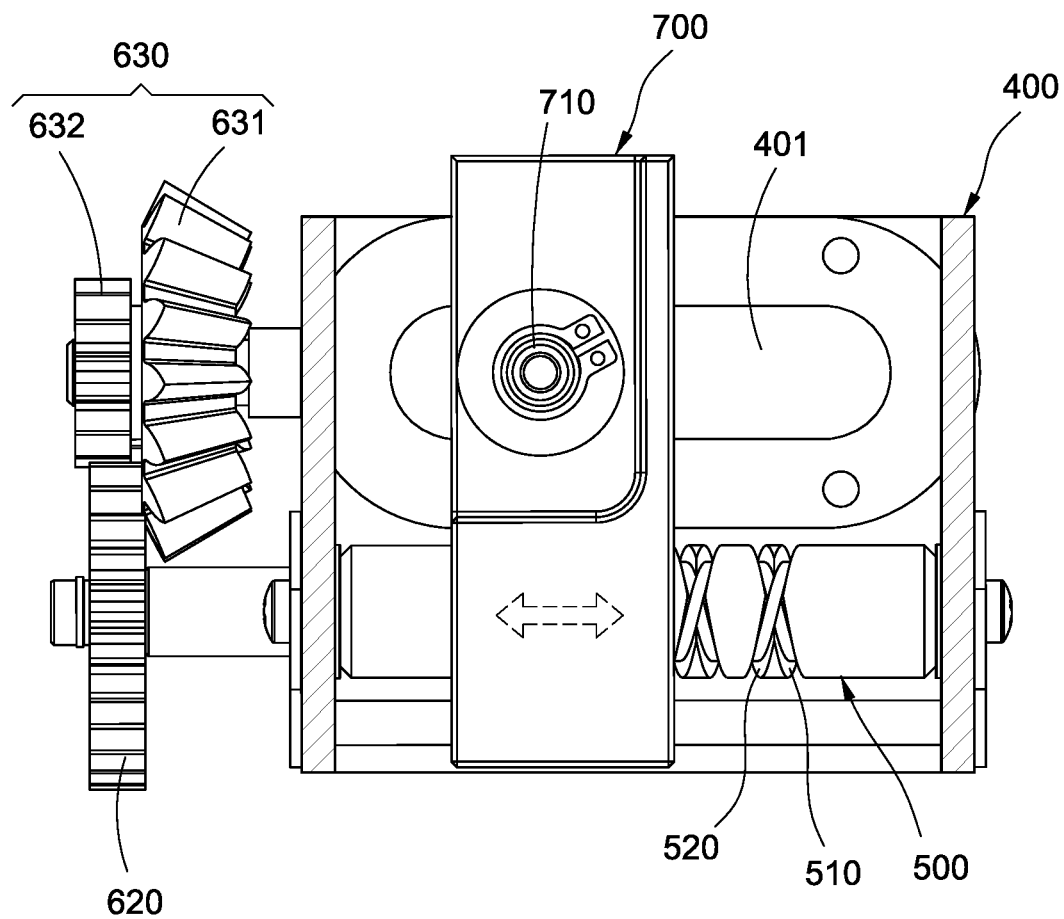
FIGS. 5 and 6 are cross-sectional schematic views of the spiral water filling device of the first embodiment of the disclosure.
Figure 6:
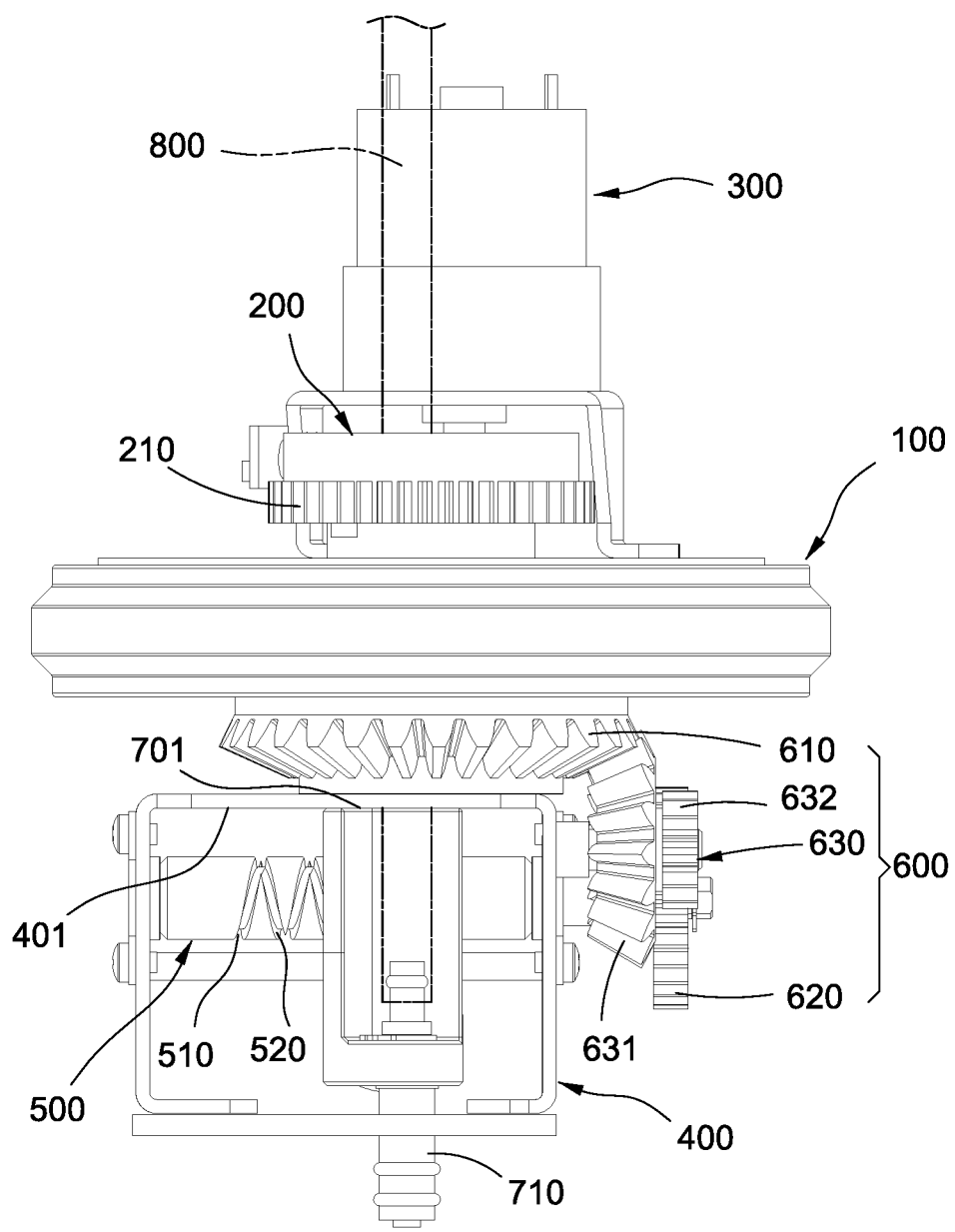

Please refer to FIGS. 1-6. The first embodiment of the disclosure provides a spiral water filling device, which includes a fixing base 100, a rotating shaft tube 200, a motor 300, a carrier frame 400, a reciprocating screw 500, a transmission gear set 600, a nut slider 700 and a water filling soft pipe 800.

The rotating shaft tube 200 is pivotally disposed on the fixing base 100. The motor 300 is fixed on the fixing base 100 and engages with an annular regular tooth 210 on an outer surface of the rotating shaft tube 200 to drive the rotating shaft tube 200. The carrier frame 400 is connected with the rotating shaft tube 200 to rotate in conjunction with the rotating shaft tube 200. The carrier frame 400 is provided with a first guiding structure 401. The reciprocating screw 500 is pivotally disposed on the carrier frame 400. The reciprocating screw 500 is perpendicular to the rotating shaft tube 200 and parallel to the first guiding structure 401. The reciprocating screw 500 is arranged on a side near the rotating shaft tube 200. Thus, a central axial line of the reciprocating screw 500 and a central axial line of the rotating shaft tube 200 are non-intersected.

The transmission gear set 600 is connected between the rotating shaft tube 200 and the reciprocating screw 500 to make the rotating shaft tube 200 drive the reciprocating screw 500. In detail, the transmission gear set 600 includes an annular bevel gear 610, a regular gear 620, and a reduction gear 630. The annular bevel gear 610 surrounds the rotating shaft tube 200. The regular gear 620 is coaxially connected with the reciprocating screw 500. The reduction gear 630 includes a bevel gear end 631 and a regular gear end 632 coaxially arranged. The bevel gear end 631 engages with the annular bevel gear 610 and the regular gear end 632 engages with the regular gear 620. A first thread groove 510 and a second thread groove 520 are disposed on an outer side wall of the reciprocating screw 500. The first thread groove 510 and the second thread groove 520 are opposite in spiral direction and intersected with each other.

The nut slider 700 engages with the reciprocating screw 500 and the reciprocating screw 500 is sheathed with the nut slider 700. In detail, the nut slider 700 has a key bar 720 which engages with the reciprocating screw 500. The key bar 720 is pivotally disposed in the nut slider 700 to deflect to engage with the first thread groove 510 or the second thread groove 520. The first guiding structure 401 and the second guiding structure 701 are respectively formed into a plane or a curved surface, which are slidably attached to each other. In this embodiment, the first guiding structure 401 and the second guiding structure 701 are respectively formed into a plane, which are slidably attached to each other. The first guiding structure 401 is formed as an inner top surface of the carrier frame 400. The second guiding structure 701 is formed as an outer top surface of the nut slider 700 and is attached on the inner top surface of the carrier frame 400. The reciprocating screw 500 is perpendicular to the rotating shaft tube 200 and parallel to the inner top surface of the carrier frame 400. The first guiding structure 401 and the second guiding structure 701, which are attached to each other, may prevent the reciprocating screw 500 from driving the nut slider 700 to rotate, so the key bar 720 may move along the first thread groove 510 or the second thread groove 520 to further reciprocatingly move the nut slider 700 along the reciprocating screw 500 longitudinally.

The nut slider 700 has a water outlet 710 and a second guiding structure 701 attached on the first guiding structure 401. The water outlet 710 is parallel to the rotating shaft tube 200. The carrier frame 400 is disposed with a guiding trough 402. The water outlet 710 perpendicularly penetrates the guiding trough 402 and is slidable along the guiding trough 402. The guiding trough 402 is perpendicular to the rotating shaft tube 200 and parallel to the reciprocating screw 500. A central axial line of the guiding trough 402 intersects the central axial line of the rotating shaft tube 200. When the nut slider 700 is moving, the nut slider 700 may drive the water outlet 710 to reciprocatingly move along the rotating shaft tube 200 radially.

When using the spiral water filing device of the disclosure, the motor 300 drives the carrier frame 400 to rotate about the rotating shaft tube 200 as central axis, and the reciprocating screw 500 is driven through the transmission gear set 600 to linearly and reciprocatingly move the water outlet 710 along the rotating shaft tube 200 radially. Therefore, the water outlet 710 may horizontally move along the spiral path. By the above-mentioned arrangement, the reciprocating screw 500 is arranged on a side near the rotating shaft tube 200 to make the water filling soft pipe 800 pass through the rotating shaft tube 200 and extend into the carrier frame 400 to connect with the water outlet 710. As a result, the water filling soft pipe 800 of the spiral water filling device of the disclosure may be hidden inside. Apart from aesthetic appearances, no interference may occur when the water outlet 710 is moving. In this embodiment, the water outlet 710 may be pivotally disposed on the nut slider 700 along the central axis thereof. Thus, when the water outlet 710 is moving horizontally, rotation is tolerable and the water filling soft pipe 800 is prevented from being twisted.

Figure 7:
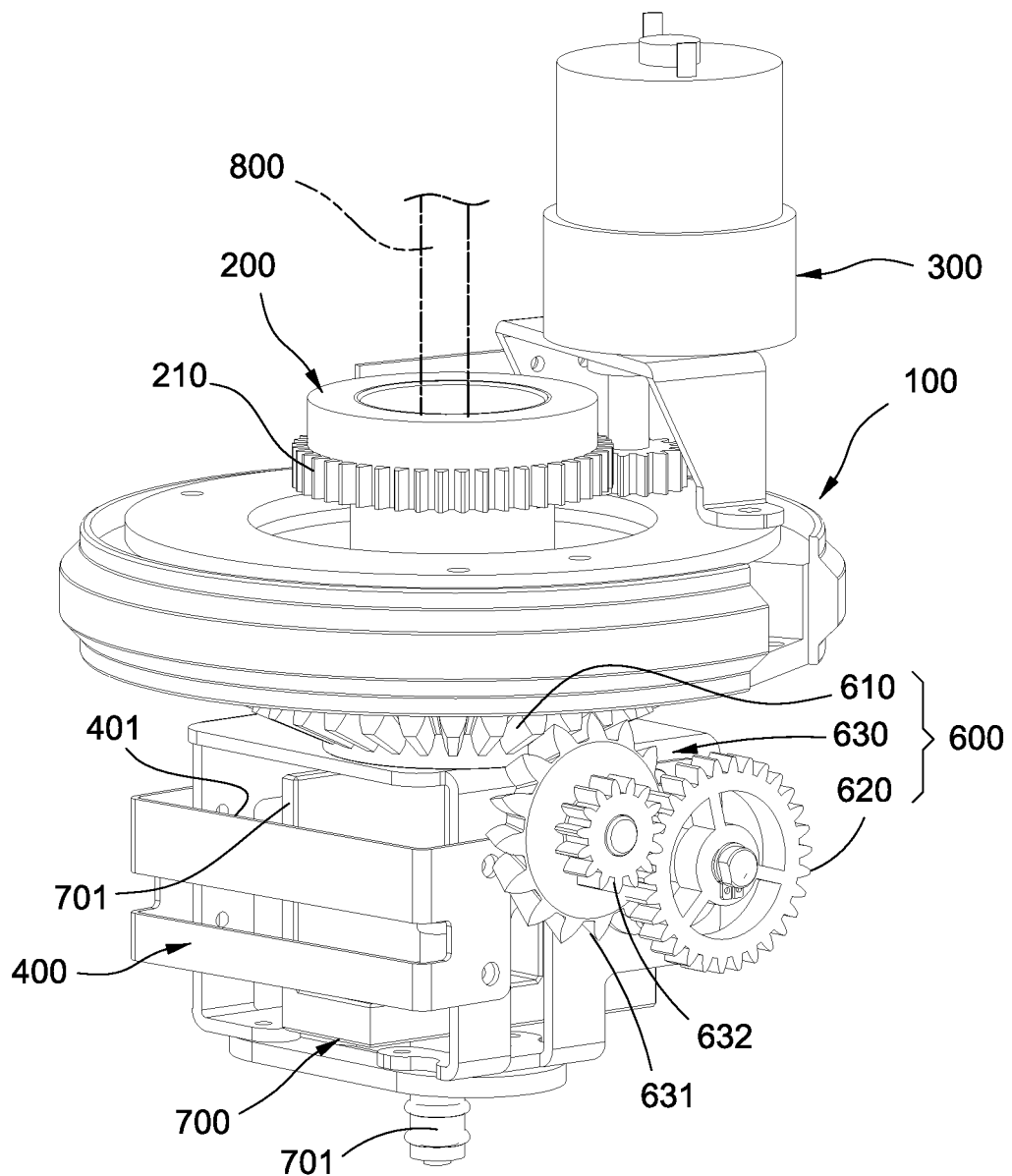
FIG. 7 is a schematic view of another implementation of the spiral water filling device of the first embodiment of the disclosure.

Please refer to FIG. 7, which shows another implementation of the first guiding structure 401 and the second guiding structure 701. The first guiding structure 401 and the second guiding structure 701 are respectively formed into a plane or a curved surface, which are slidably attached to each other. The first guiding structure 401 may be formed as an inner side of the carrier frame 400 and the second guiding structure 701 is formed as an outer side of the nut slider 700 to be attached to the inner side of the carrier frame 400. The reciprocating screw 500 is perpendicular to the rotating shaft tube 200 and parallel to the inner side of the carrier frame 400. The first guiding structure 401 is attached to the second guiding structure 701 to prevent the reciprocating screw 500 from driving the nut slider 700 to rotate. Furthermore, the key bar 720 may move along the first thread groove 510 or the second thread groove 520 to reciprocatingly move the nut slider 700 along the reciprocating screw 500 longitudinally.

Figure 8:
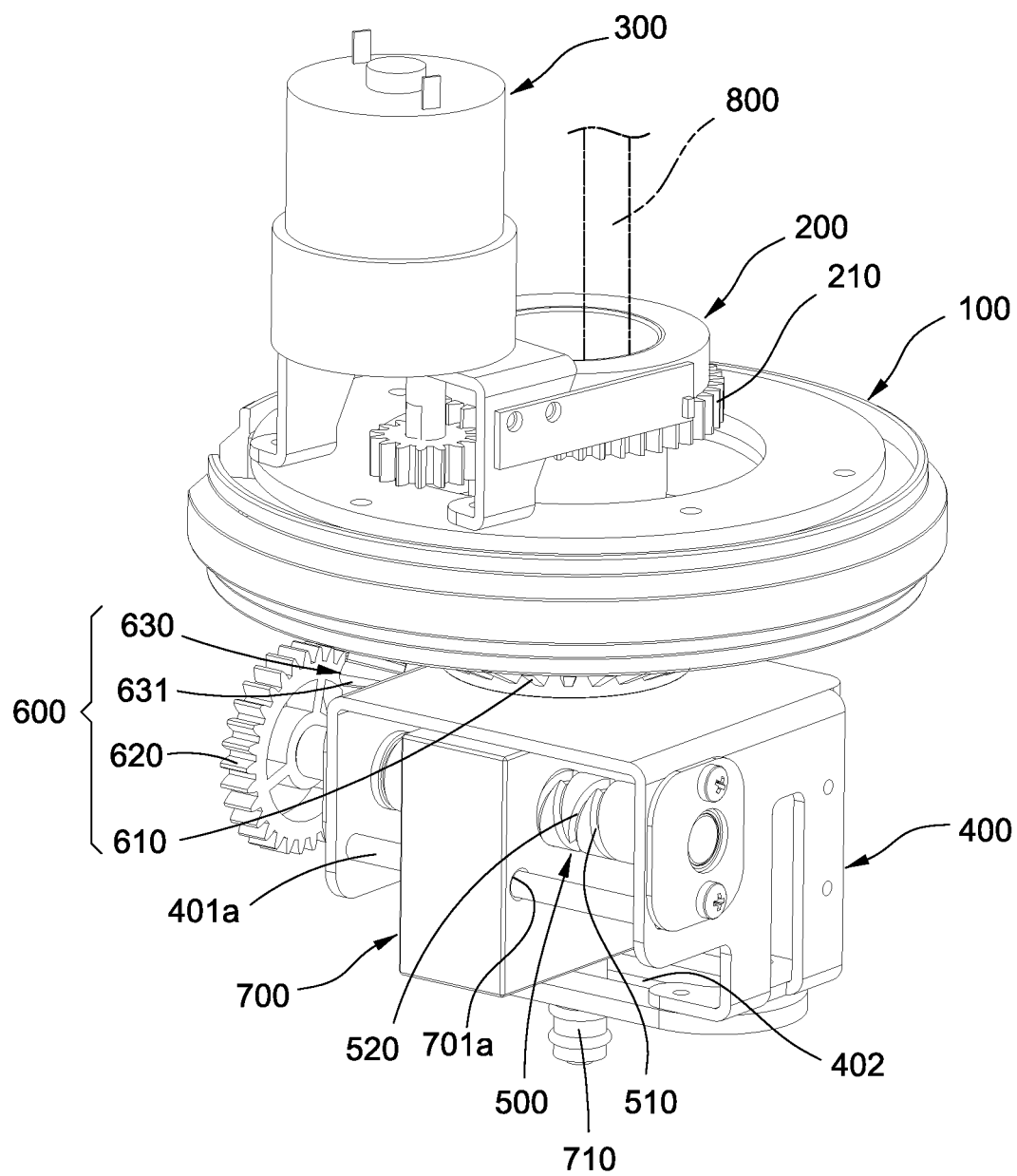
FIG. 8 is a perspective schematic view of the spiral water filling device of the second embodiment of the disclosure.

Please refer to FIG. 8. The second embodiment of the disclosure provides a water filling device, which includes a fixing base 100, a rotating shaft tube 200, a motor 300, a carrier frame 400, a reciprocating screw 500, a transmission gear set 600, a nut slider 700 and a water filling soft pipe 800. This embodiment is similar to the above-mentioned first embodiment. The difference between this embodiment and the first embodiment is that the first guiding structure 401a is a rod and the second guiding structure 701a is a channel correspondingly. The first guiding structure 401a movably passes through the second guiding structure 701a and an outer wall surface of the rod is attached to an inner wall surface of the channel. The reciprocating screw 500 is perpendicular to the rotating shaft tube 200 and parallel to the rod. The first guiding structure 401a is attached to the second guiding structure 701a to prevent the reciprocating screw 500 from driving the nut slider 700 to rotate. Furthermore, the key bar 720 may move along the first thread groove 510 or the second thread groove 520 to reciprocatingly move the nut slider 700 along the reciprocating screw 500 longitudinally.

It will be appreciated by persons skilled in the art that the above embodiments have been described by way of example only and not in any limitative sense, and that various alterations and modifications are possible without departure from the scope of the disclosure as defined by the appended claims.

What is claimed is:

1. A spiral water filling device comprising:
a fixing base;
a rotating shaft tube, pivotally disposed on the fixing base;
a motor, fixed on the fixing base, and engaging with an outer wall of the rotating shaft tube to drive the rotating shaft tube;
a carrier frame, connected with the rotating shaft tube to rotate in conjunction with the rotating shaft tube, and comprising a first guiding structure disposed thereon;
a reciprocating screw, pivotally disposed on the carrier frame, perpendicular to the rotating shaft tube and parallel to the first guiding structure, a central axial line thereof and a central axial line of the rotating shaft tube being non-intersected;
a transmission gear set, connected between the rotating shaft tube and the reciprocating screw, the rotating shaft tube driving the reciprocating screw through the transmission gear set;
a nut slider, connected and engaging with the reciprocating screw, comprising a water outlet and a second guiding structure attached on the first guiding structure, and the water outlet parallel to the rotating shaft tube; and
a water filling soft pipe, passing through the rotating shaft tube, and connected with the water outlet,
wherein a first thread groove and a second thread groove are disposed on an outer side wall of the reciprocating screw opposite in spiral direction and intersected with each other.

2. The spiral water filling device of claim 1, wherein the transmission gear set comprises an annular bevel gear, a regular gear and a reduction gear, the annular bevel gear surrounds the rotating shaft tube, the regular gear is coaxially connected with the reciprocating screw, the reduction gear comprises a bevel gear end and a regular gear end coaxially arranged, the bevel gear end engages with the annular bevel gear, and the regular gear end engages with the regular gear.

3. The spiral water filling device of claim 1, wherein a key bar is disposed in the nut slider and engages with the reciprocating screw.

4. The spiral water filling device of claim 3, wherein the key bar is pivotally disposed in the nut slider to deflect.

5. The spiral water filling device of claim 1, wherein the carrier frame comprises a guiding trough, and the water outlet perpendicularly penetrates the guiding trough and is slidable along the guiding trough.

6. The spiral water filling device of claim 1, wherein the guiding trough is perpendicular to the rotating shaft tube and parallel to the reciprocating screw.

7. The spiral water filling device of claim 6, wherein a central axial line of the guiding trough intersects the central axial line of the rotating shaft tube.

8. The spiral water filling device of claim 1, wherein the first guiding structure and the second guiding structure comprise a plane respectively.

9. The spiral water filling device of claim 1, wherein the first guiding structure comprises a rod and the second guiding structure comprises a channel.

\* \* \* \* \*